United States Patent
Kikuchi

(10) Patent No.: US 8,081,231 B2
(45) Date of Patent: Dec. 20, 2011

(54) LENS-INTERCHANGEABLE CAMERA AND METHOD OF CONTROLLING THE SAME

(75) Inventor: Tomoe Kikuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 12/792,109

(22) Filed: Jun. 2, 2010

(65) Prior Publication Data

US 2010/0328480 A1  Dec. 30, 2010

(30) Foreign Application Priority Data

Jun. 29, 2009  (JP) ................................. 2009-153990

(51) Int. Cl.
*H04N 5/228*  (2006.01)

(52) U.S. Cl. .................. 348/222.1; 348/360; 348/221.1; 348/239

(58) Field of Classification Search .................. 348/360, 348/222.1, 239
See application file for complete search history.

(56) References Cited

U.S. PATENT DOCUMENTS

| | | | | |
|---|---|---|---|---|
| 4,816,663 A | * | 3/1989 | Utagawa et al. | 250/201.2 |
| 5,422,701 A | * | 6/1995 | Utagawa | 396/92 |
| 5,630,180 A | * | 5/1997 | Kusaka | 396/63 |
| 5,713,053 A | * | 1/1998 | Hirai | 396/92 |
| 6,813,442 B2 | * | 11/2004 | Matsuda | 396/91 |
| 2002/0105589 A1 | * | 8/2002 | Brandenberger et al. | 348/360 |
| 2003/0048374 A1 | * | 3/2003 | Minakuti et al. | 348/360 |
| 2008/0079821 A1 | | 4/2008 | Nagata et al. | |
| 2008/0079836 A1 | * | 4/2008 | Nagata et al. | 348/340 |

FOREIGN PATENT DOCUMENTS

| | | |
|---|---|---|
| JP | 62-127976 A | 6/1987 |
| JP | 11-112859 A1 | 4/1999 |
| JP | 2004-205802 A | 7/2004 |
| JP | 2008-092000 A | 4/2008 |
| JP | 2008-092001 A | 4/2008 |

* cited by examiner

*Primary Examiner* — Jason Chan
*Assistant Examiner* — Cynthia Calderon
(74) *Attorney, Agent, or Firm* — Fitzpatrick, Cella, Harper & Scinto

(57) ABSTRACT

Image processing parameters including the sensor pitch, optical low-pass filter, and spectral transmittances of color component filters of an image sensor are transmitted to a photographing lens. After the start of image capturing, it is determined whether to send a transmission request of recovery filters to the photographing lens. To send the transmission request, capturing parameters set for image capturing are sent to the photographing lens. Recovery filters corresponding to the capturing parameters, which is created by the photographing lens based on the image processing parameters, are received from the photographing lens, and stored in a memory.

7 Claims, 9 Drawing Sheets

LENS-INTERCHANGEABLE CAMERA AND METHOD OF CONTROLLING THE SAME

BACKGROUND OF THE INVENTION

1. Field of the Invention

The present invention relates to a lens-interchangeable camera and a method of controlling the same.

2. Description of the Related Art

An image recovery algorithm is known to recover an image that is obtained by an image capturing apparatus such as a digital still camera and degraded due to aberration or the like. As the image recovery algorithm, a method is known which, for example, expresses an image degradation characteristic as a point spread function (to be referred to as a PSF hereinafter), and recovers an image to a degradation-free image based on the PSF. As such an algorithm, for example, Japanese Patent Laid-Open No. 62-127976 discloses a method of correcting a blur using a filter with a characteristic opposite to the PSF. Japanese Patent Laid-Open No. 2004-205802 discloses a method of generating a Wiener filter from a PSF and recovering a degraded image using the Wiener filter. A recovery process filter expressed by a Wiener filter is given by $$OTF(u,v)/(|OTF(u,v)|^2+c) \qquad (1)$$

where OTF (u,v) is an optical transfer function (to be referred to as an OTF hereinafter) at a frequency u in the x direction and a frequency v in the y direction, and c is a constant having a very small value. When performing image recovery processing using a real space filter, the Wiener filter obtained by expression (1) is returned to a real space filter by inverse Fourier transformation and then applied.

In addition, Japanese Patent Laid-Open Nos. 11-112859, 2008-92000, and 2008-92001 disclose techniques of performing correction according to optical characteristics unique to a lens, although no specific filtering schemes are mentioned.

Ideally, a recovery filter optimum for capturing conditions is used. However, creating a recovery filter every time the capturing conditions change is very expensive. Additionally, although the amount of OTF data necessary for filter creation is very large, the communication speed between the lens and the camera is very low. To hold recovery filters for every capturing condition in a memory in advance, the memory requires a very large capacity. Hence, a method needs to be devised to decrease the communication data amount by creating a recovery filter on the lens side and transmitting/receiving only filter data between the lens and the camera, and also reduce the load of recovery filter creation on the lens side.

SUMMARY OF THE INVENTION

The present invention has been made in consideration of the above-described problems, and provides a technique of reducing the process load of filter creation and decreasing the communication data amount between a lens and a camera.

According to the first aspect of the present invention, a lens-interchangeable camera mounted with a lens, comprises:

a transmission unit that transmits, to the lens, image processing parameters including a sensor pitch of an image sensor, an optical low-pass filter, and spectral transmittances of color component filters of the lens-interchangeable camera;

a determination unit that determines, after a start of image capturing, whether or not send, to the lens, a transmission request of recovery filters to be used to recover degradation of a captured image;

a request unit that sends the transmission request by transmitting capturing parameters set for image capturing to the lens when the determination unit determines to send the transmission request;

a reception unit that receives the recovery filters corresponding to the capturing parameters, the recovery filter being created by the lens based on the image processing parameters and transmitted from the lens in response to the transmission request; and a unit that stores, in a memory, the recovery filters received by the reception unit.

According to the second aspect of the present invention, a method of controlling a lens-interchangeable camera mounted with a lens, comprises the steps of:

transmitting, to the lens, image processing parameters including a sensor pitch of an image sensor, an optical low-pass filter, and spectral transmittances of color component filters of the lens-interchangeable camera;

determining, after a start of image capturing, whether or not send, to the lens, a transmission request of recovery filters to be used to recover degradation of a captured image;

sending the transmission request by transmitting capturing parameters set for image capturing to the lens when it is determined in the determining step to send the transmission request;

receiving the recovery filters corresponding to the capturing parameters, the recovery filter being created by the lens based on the image processing parameters and transmitted from the lens in response to the transmission request; and storing, in a memory, the recovery filters received in the receiving step.

Further features of the present invention will become apparent from the following description of exemplary embodiments with reference to the attached drawings.

DESCRIPTION OF THE EMBODIMENTS

Embodiments of the present invention will now be described with reference to the accompanying drawings. Note that the embodiments to be described below are merely examples of specifically practicing the present invention.

First Embodiment

A lens-interchangeable camera according to this embodiment will be described with reference to FIGS. 1A, 1B, and 2.

The lens-interchangeable camera can exchange the lens to be attached to it. In this embodiment, the camera is a digital camera.

Figure 1A:
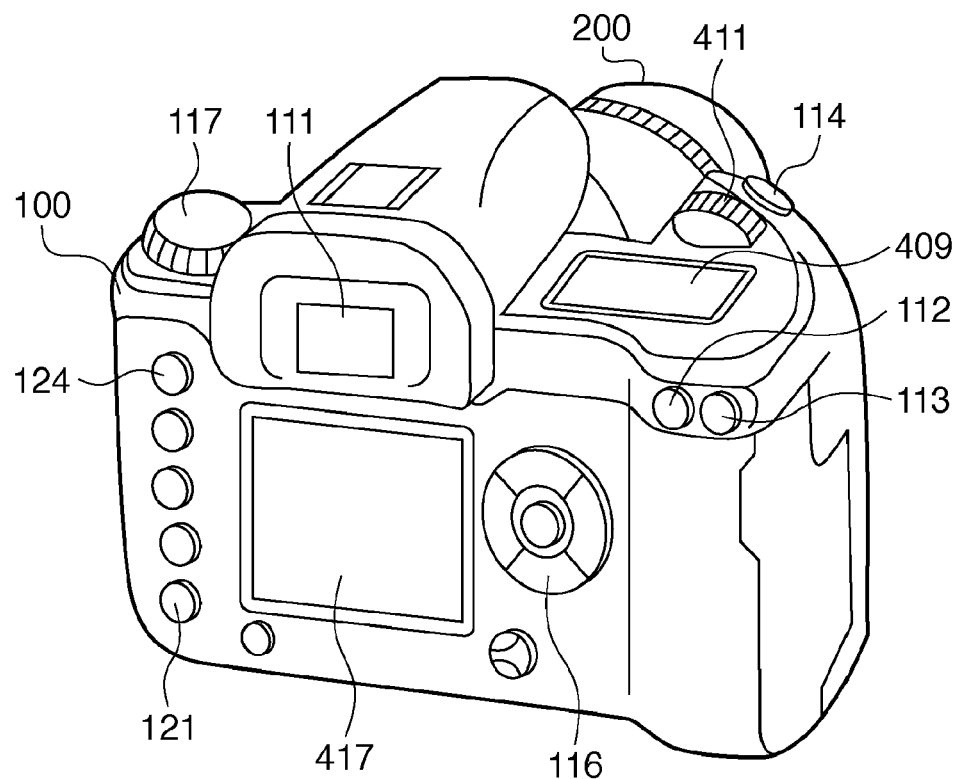
FIGS. 1A and 1B are views showing an example of the outer appearance of a camera 100.
Figure 2:
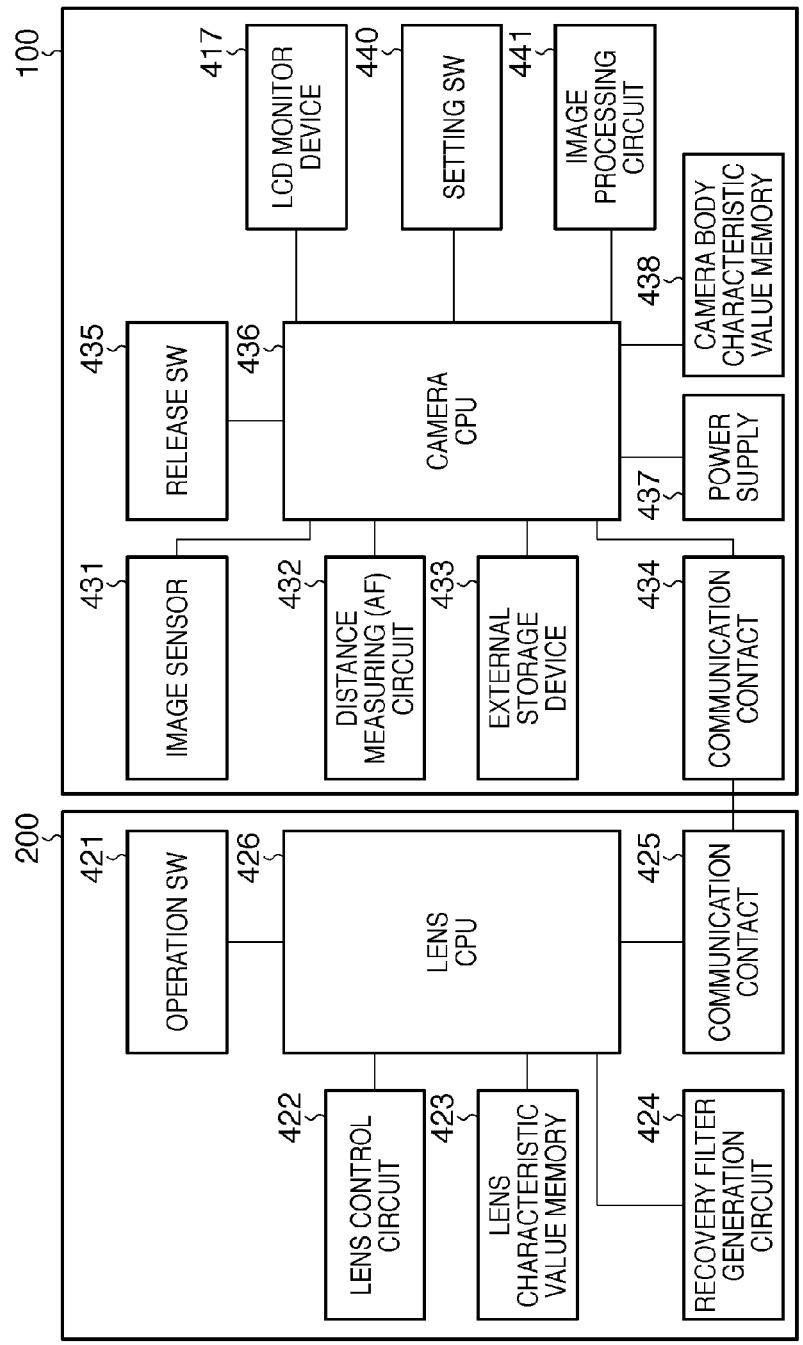
FIG. 2 is a block diagram showing the circuit arrangements of the camera 100 and a photographing lens 200.

Referring to FIG. 1A, a camera 100 includes, at its upper portion, an ocular window 111 for viewfinder observation, an AE (Automatic Exposure) lock button 112, an AF distance measuring point selection button 113, and a release button 114 for a capturing operation. The camera 100 also includes an electronic dial 411, capturing mode selection button 117, and external display device 409. The electronic dial 411 is a multi-function signal input device to be used, together with other operation buttons, to input a numerical value to the camera 100 or switch the capturing mode. The external display device 409 is formed from a liquid crystal display device to display capturing conditions (capturing parameters) such as a shutter speed, aperture value, and capturing mode or other information.

The camera 100 includes, on its rear surface, an LCD monitor device 417 which displays a captured image or various kinds of setting windows, a monitor switch 121 to be used to turn on/off the LCD monitor device 417, a 5-way selector 116, and a menu button 124. The 5-way selector 116 has four buttons arranged on upper, lower, left, and right sides, and a SET button arranged at the center. The 5-way selector 116 is used to instruct the camera 100 to select or execute a menu item or the like displayed on the LCD monitor device 417. The menu button 124 causes the LCD monitor device 417 to display a menu window to do various kinds of settings for the camera 100. For example, to select and set a capturing mode (including a drive mode to be described later), the user presses the menu button 124 and then operates the upper, lower, left, and right buttons of the 5-way selector 116 to select a desired mode. When the user presses the SET button in the state in which the desired mode is selected, setting is completed.

A photographing lens 200 of a capturing optical system is detachably attached to the camera 100 via a lens mount (not shown). The photographing lens 200 and the camera 100 can communicate via the contact of the lens mount.

Figure 1B:
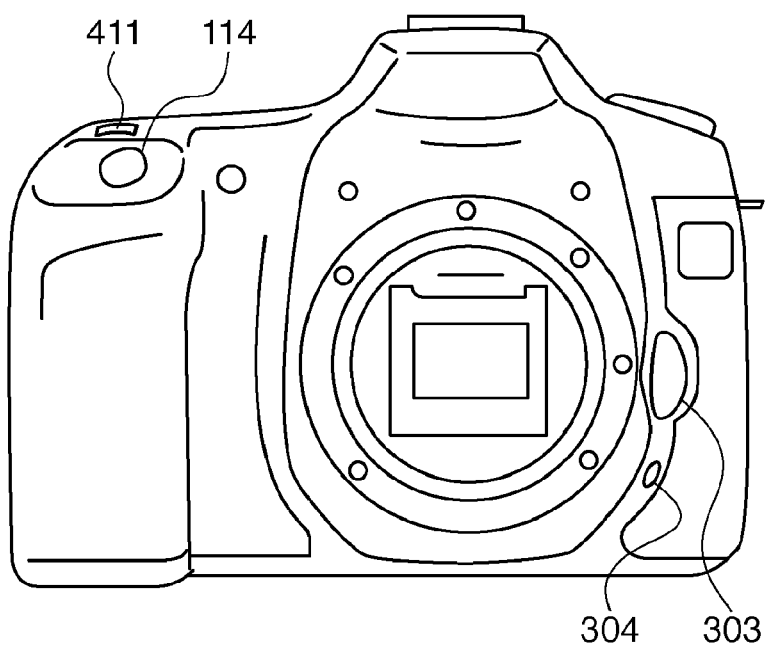

Referring to FIG. 1B, a lens detachment button 303 is pressed to detach the photographing lens 200 from the camera 100. When the user presses a stop-down button 304, the stop of the lens is stopped down to an aperture value set at that point of time so that the depth of field can be confirmed on the LCD monitor device 417. In a normal state in which the stop-down button 304 is not pressed, the LCD monitor device 417 displays an image in a full-aperture state.

The circuit arrangements of the camera 100 and the photographing lens 200 will be described next with reference to the block diagram of FIG. 2. The photographing lens 200 and the camera 100 can communicate via a communication contact 425 on the side of the photographing lens 200 and a communication contact 434 on the side of the camera 100. In this embodiment, the communication speed between the camera 100 and the photographing lens 200 is assumed to be 500 [Kbps], for the descriptive convenience. The essence of the description does not depend on this communication speed, as a matter of course.

An operation SW (switch) 421 notifies a lens CPU 426 of signals of a number of switches including the electronic dial 411 provided on the camera 100. Based on this notification, zooming, focusing, and an aperture value are set by manual operations, or switching between auto focus and manual focus is done. A lens control circuit 422 controls communication with a lens group (not shown) in the photographing lens 200 and driving of a lens and diaphragm blade in an AF (Auto Focus) mode.

A lens characteristic value memory 423 stores not only information (e.g., ID) unique to the photographing lens 200, focal length information, and the like but also the OTF data of the photographing lens 200 corresponding to zoom, stop, capturing distance, and image height.

A recovery filter generation circuit 424 generates a recovery filter in response to a request from the camera 100. The recovery filter is used to recover degradation of a captured image, as described above. The lens CPU 426 controls the operations of the units included in the photographing lens 200. A computer program for the operation control is stored in the internal memory (not shown) of the lens CPU 426. The lens CPU 426 executes processing using the computer program, thereby controlling the operations of the units included in the photographing lens 200.

Object light that has passed through a capturing optical system formed from a lens group (not shown) and a stop forms an image on the imaging plane (light-receiving plane) of an image sensor 431. The image sensor 431 is formed from a photoelectric conversion element such as a CCD or CMOS, and photoelectrically converts an optical image into an electrical signal. In this embodiment, the image sensor 431 is a single-CCD including color filters arrayed in a typical Bayer matrix.

A distance measuring (AF) circuit 432 detects a defocus amount for the object for AF. An external storage device 433 is, for example, a hard disk drive or a semiconductor memory card detachably attached to the camera 100. A release SW 435 is a release switch formed from a two-stroke switch. More specifically, the release SW 435 has a switch that makes the camera 100 ready for image capturing in a halfway pressed state of the release button 114, and a switch that starts exposure on the image sensor 431 in a completely pressed state (fully pressed state) of the release button 114. A power supply 437 supplies a power to the units included in the camera 100. The LCD monitor device 417 displays a live view image of an object in real time or a moving image or still image captured using the image sensor 431. A setting SW 440 is operated to set a capturing mode and the like.

A camera body characteristic value memory 438 stores image processing parameters such as information (e.g., ID) unique to the camera 100, the sensor pitch information of the image sensor 431, pixel pitch information in the live view mode, a pixel pitch in enlarged display on live view, an aperture shape, optical LPF (optical low-pass filter) information, and the spectral characteristic information of RGB filters. Note that if the color components of an image are not RGB, color component filters other than RGB filters may be used.

Note that the image processing parameters stored in the camera body characteristic value memory 438 will sometimes be called collectively as "characteristic values of the camera 100" hereinafter. Information to be included in the characteristic values of the camera 100 is not limited to those described above.

An image processing circuit 441 executes amplification and A/D conversion of a signal read from the image sensor 431, thereby generating a digital signal. In this embodiment, the image processing circuit 441 also performs processing of applying a recovery filter to correct a blur in the image as the digital signal.

A camera CPU 436 controls the operations of the units included in the camera 100. A computer program for the operation control is stored in the internal memory (not shown) of the camera CPU 436. The camera CPU 436 executes processing using the computer program, thereby controlling the operations of the units included in the camera 100.

As the OTF data of the photographing lens 200, the lens characteristic value memory 423 stores OTF data for each capturing parameter (zoom position, f-number, and capturing distance). In this embodiment, an OTF data group of wavelengths ranging from 400 [nm] to 700 [nm] in steps of 10 [nm] are stored in accordance with the combinations of zoom position, capturing distance, aperture value, and image height. These OTF data are used to generate a recovery filter.

Let fx be the spatial frequency in the x direction (horizontal direction) and fy be the spatial frequency in the y direction (vertical direction) of an image. Each OTF data is created using [line pair/mm] as the unit of each frequency that does not depend on the sensor pitch. In a continuous shooting mode (a mode to continuously perform image capturing), a recovery filter is created only in image capturing of the first frame.

In this embodiment, a case will be examined in which the user switches the drive mode to the continuous shooting mode, determines the composition by changing the stop and zoom, adjusts a focus by pressing the release button 114 halfway, and then presses the release button 114 fully to perform high-speed continuous shooting. The drive mode is a mode that allows selection of single shooting or continuous shooting.

A case in which a recovery filter is created on the side of the camera 100 and a case in which a recovery filter is created on the side of the photographing lens 200 will be explained. First, a case in which a recovery filter is created on the side of the camera 100 will be described.

OTF data is two-dimensional frequency data whose value is represented by a complex number. To hold OTF data independent of the camera 100 on the side of the photographing lens 200, OTF data is necessary for every incident wavelength (for example, wavelengths ranging from 400 to 700 [nm] in steps of 10 [nm]). Assuming that the size of OTF data for one wavelength is 15 KB, the total size of OTF data for all incident wavelengths is 15 KB×31=465 KB. In addition, since the OTF data itself changes depending on the stop, zoom, capturing distance, and image height, the size of OTF data held on the side of the photographing lens 200 is several MB to several GB.

On the other hand, the communication band between the lens and the camera is as very narrow as about 500 Kbps. Assume that the amount of OTF data is 300 [MB]. The time necessary for transmitting the OTF data from the photographing lens 200 to the camera 100 at the communication speed of 500 [Kbps] is simply calculated as 80 min. That is, transmitting all OTF data from the photographing lens 200 to the camera 100 requires a very long time. Every time the stop, zoom, and capturing distance change, only OTF data corresponding to the capturing conditions may be sent. In this case, OTF data for all wavelengths corresponding to the capturing conditions are sent as much as the image height. If the amount of OTF data to be transmitted is about 5 [MB], the transmission takes 80 [sec] at the communication speed of 500 [Kbps]. Although the transmission time is much shorter than in the above-described case, it is too long to confirm recovered image data in live view display before image capturing.

A case in which a recovery filter is created on the side of the photographing lens 200 will be described next. As described above, the camera 100 transmits its characteristic values to the photographing lens 200. The characteristic values have a data size smaller than that of the above-described OTF data, and are uniquely determined for the camera 100. For this reason, the characteristic values need to be sent only once when the photographing lens 200 is attached to the camera 100, or the camera 100 is powered on.

The data size of a recovery filter is several KB to several ten KB. For example, when the filter size is 15×15, the filter coefficients are of double type, and the number of filters necessary for one frame to cope with each image height is 10, the data size of the recovery filters is 18 [KB]. This data size allows transmission for about 0.3 [sec] even when the communication speed between the lens and the camera is 500 [Kbps]. This method cannot only always cope with a new lens but also decrease the data transfer amount between the lens and the camera to some extent. However, creating a recovery filter on the lens size and transmitting it from the lens to the camera every time the release button is fully pressed enormously increases the load on the lens. Especially in the continuous shooting mode, since the release button remains at the full stroke position, image capturing is repeated a plurality of number of times in a short time. Creating a recovery filter for each shot increases the load on the lens side.

Figure 3:
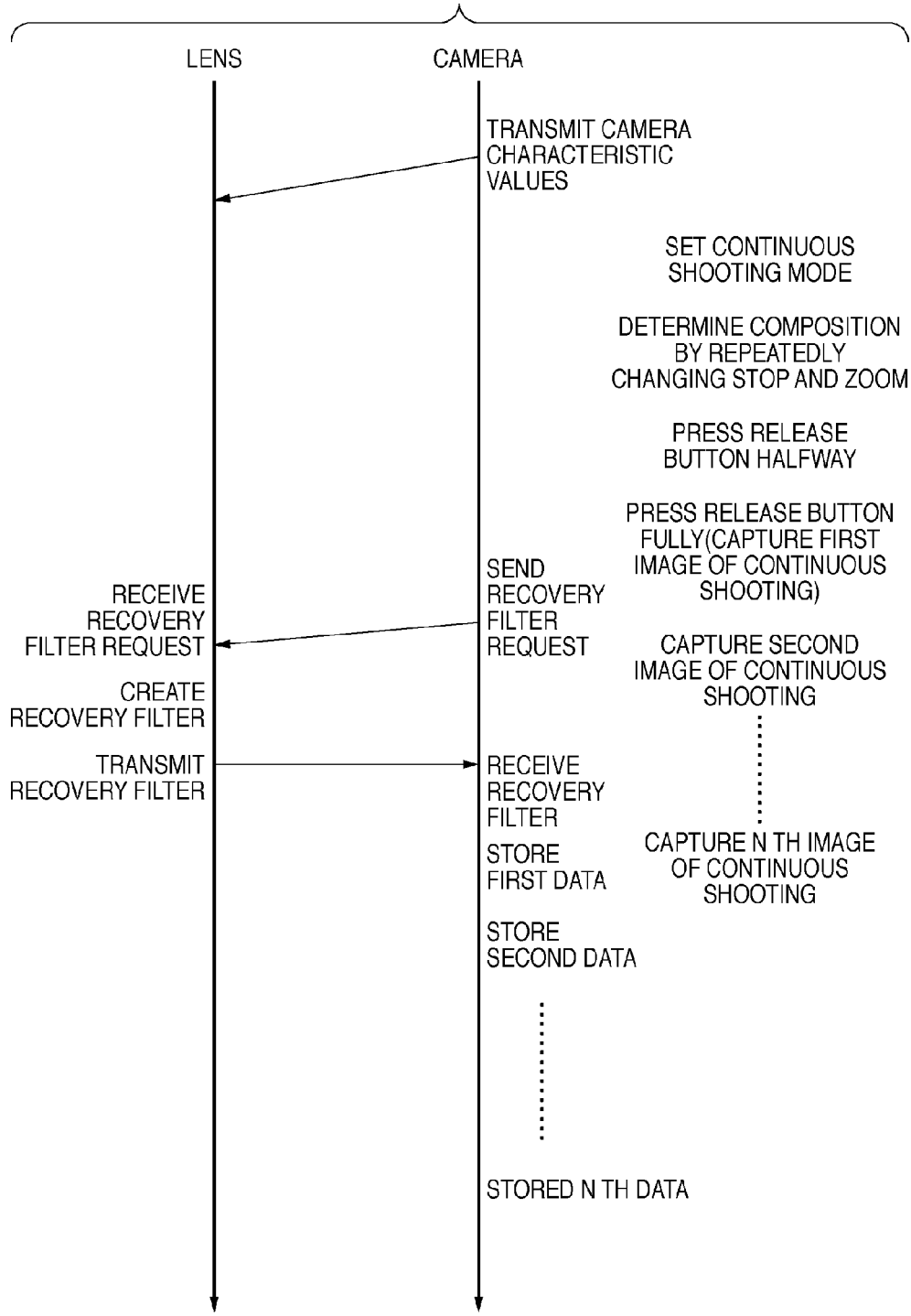
FIG. 3 is a sequence chart showing the operations of the camera 100 and the photographing lens 200.

The operations of the camera 100 and the photographing lens 200 for image capturing in the continuous shooting mode will be described with reference to the sequence chart of FIG. 3. When the photographing lens 200 is attached to the camera 100, or when the camera 100 with the photographing lens 200 attached is powered on, the camera 100 reads out its characteristic values stored in the camera body characteristic value memory 438. The camera 100 transmits the readout characteristic values to the photographing lens 200 via the communication contacts 434 and 425.

After setting the continuous shooting mode, the user determines the composition by repeatedly changing the stop and zoom, and then presses the release button 114 halfway to adjust a focus. After that, the user presses the release button 114 fully to start continuous shooting. After the start of continuous shooting, images are stored in the memory (e.g., external storage device 433) of the camera 100 in the image capturing order. Upon detecting the fully pressed state of the release button in the continuous shooting mode, the camera 100 requests the photographing lens 200 to send a recovery filter suitable for the capturing conditions of an image to be captured first in continuous shooting. In this request, the camera 100 transmits, to the photographing lens 200, capturing parameters representing the aperture value, zoom position, and capturing distance set for image capturing on the side of the camera 100.

Upon receiving the recovery filter transmission request, the photographing lens 200 creates recovery filters suitable for the capturing conditions (aperture value, zoom position, and capturing distance) of the image to be captured first in continuous shooting, and transmits the created recovery filters to the camera 100. The camera 100 under the continuous shooting receives the recovery filters transmitted from the photographing lens 200.

To store images captured upon continuous shooting as JPEG data, the images captured by continuous shooting are sequentially read out. The received recovery filters are applied to the readout images, and each image to which the recovery filters have been applied is JPEG-coded. Each coded data is written in the external storage device 433 in a format such as Exif. On the other hand, to directly store the images captured upon continuous shooting (RAW storage), the sequentially captured images and the recovery filters are put in one file, and the file is written in the external storage device 433.

Figure 4:
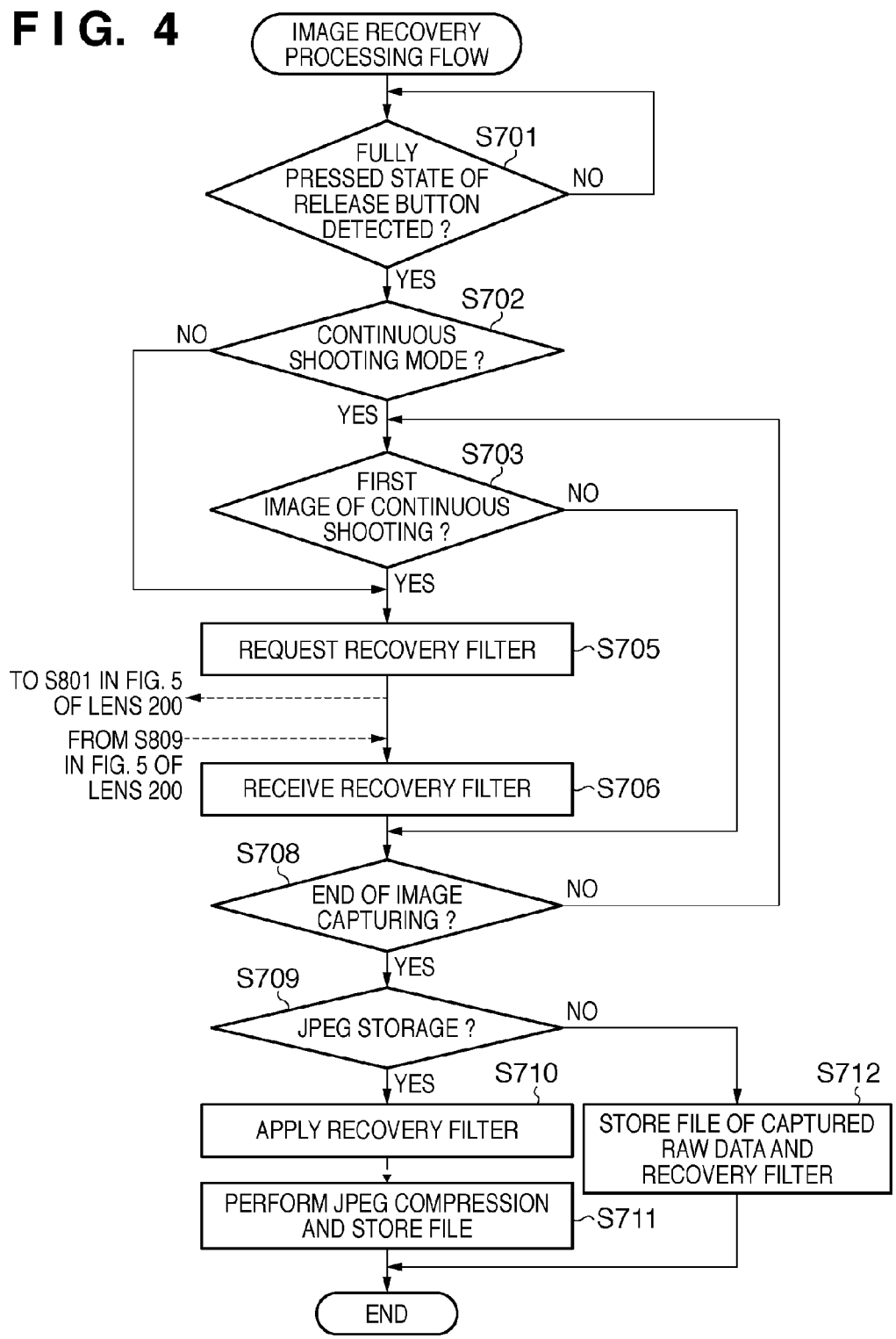
FIG. 4 is a flowchart illustrating the operation of the camera 100.

The operation of the camera 100 will be described next with reference to the flowchart of FIG. 4. The camera 100 is assumed to have ended transmission of its characteristic value to the photographing lens 200 before processing corresponding to the flowchart in FIG. 4.

First, in step S701, the camera CPU 436 determines whether the release button 114 is fully pressed. Upon determining that the release button 114 is fully pressed, the process advances to step S702. If the release button 114 is not fully pressed, the process returns to step S701. When the process advances to step S702, image capturing starts.

In step S702, the camera CPU 436 determines whether the continuous shooting mode is set. Upon determining that the continuous shooting mode is set, the process advances to step S703. If the continuous shooting mode is not set, the process advances to step S705.

In step S703, the camera CPU 436 determines whether the captured image is the first image in a series of captured images taken in the continuous shooting mode. If the captured image is the first image after the continuous shooting mode has been set, the process advances to step S705. If the captured image is not the first image after the continuous shooting mode has been set (that is, the image is the second or subsequent image), the process advances to step S708.

In step S705, the camera CPU 436 requests the photographing lens 200 to transmit recovery filters suitable for the capturing conditions of the first image in a series of captured images taken in the continuous shooting mode. More specifically, the camera CPU 436 requests the photographing lens 200 to transmit recovery filters corresponding to the stop, zoom, and capturing distance when the release button 114 has been set in the fully pressed state. To do this, the camera CPU transmits, to the photographing lens 200 via the communication contacts 434 and 425, capturing parameters representing the aperture value, zoom position, and capturing distance set at the time of fully pressing the release button 114 (at the start of image capturing). The transmission request is done by transmitting the capturing parameters.

In step S706, the camera CPU 436 receives, via the communication contacts 434 and 425, the recovery filters transmitted from the photographing lens 200 in response to the transmission request in step S705, and stores it in the internal memory (not shown) of the camera 100. In other words, the process in step S703 corresponds to a process of determining whether to transmit the recovery filter transmission request to the photographing lens 200.

Next, in step S708, the camera CPU 436 determines whether image capturing is completed. In the continuous shooting mode, the camera CPU 436 determines whether press of the release button 114 is canceled. Upon determining that image capturing is completed, the process advances to step S709. If image capturing is not completed, the process returns to step S703.

In step S709, the camera CPU 436 refers to a preset captured image storage setting, and determines whether to store the captured images as JPEG data or as RAW data. Upon determining to store the images as JPEG data, the process advances to step S710. To store the images as RAW data, the process advances to step S712.

In step S710, the camera CPU 436 reads out the captured images from the memory (not shown), and performs filter processing for each readout image using the recovery filters received in step S706. In step S711, the images that have undergone the filter processing are JPEG-coded, and the result is stored in the external storage device 433 in a file format such as Exif.

On the other hand, in step S712, the camera CPU 436 reads out the captured images from the memory (not shown), and stores the readout images and the recovery filters received in step S706 in the external storage device 433 as one file.

Figure 5:
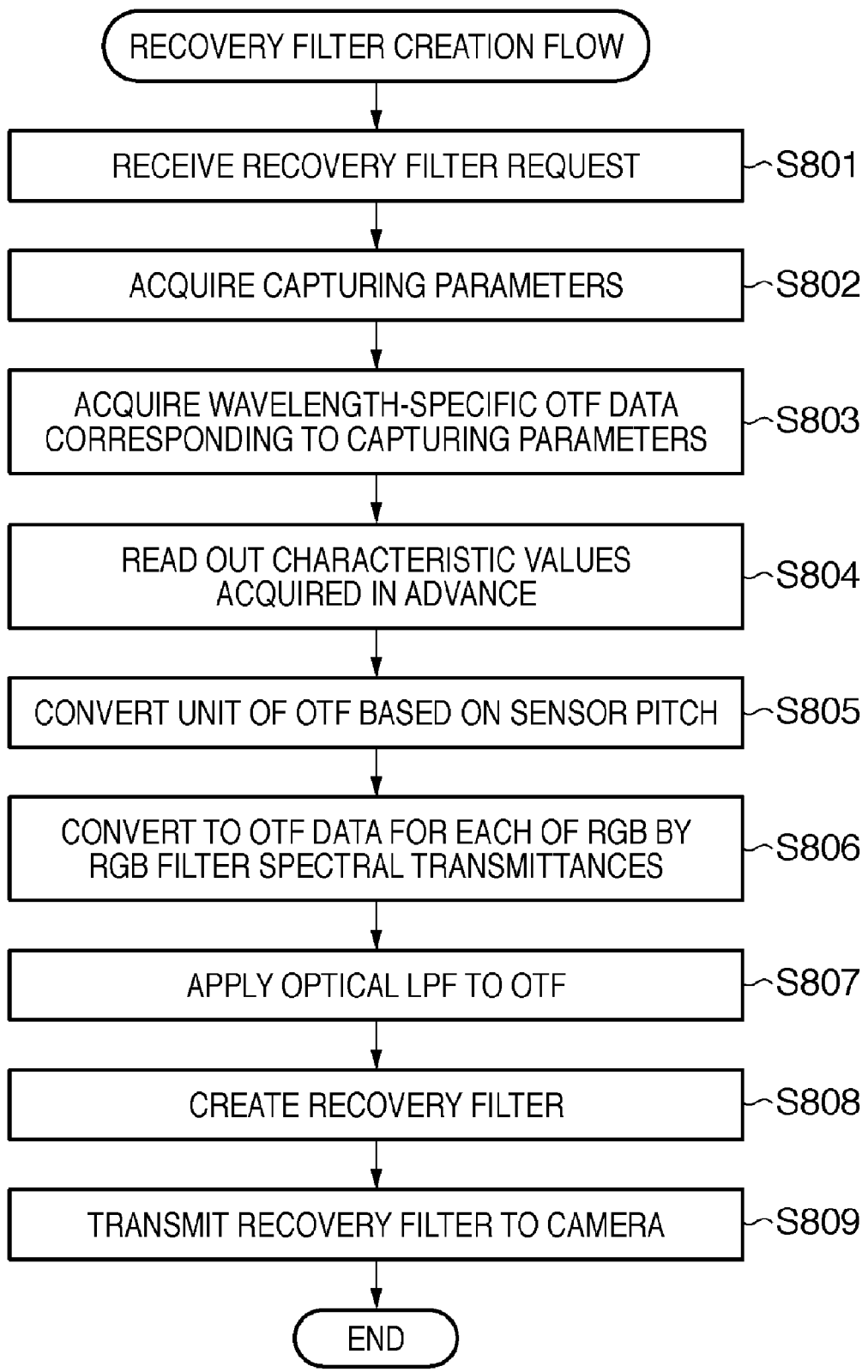
FIG. 5 is a flowchart illustrating the operation of the photographing lens 200.

The operation of the photographing lens 200 will be described next with reference to the flowchart of FIG. 5. First, in step S801, the lens CPU 426 receives, via the communication contacts 434 and 425, the transmission request sent from the camera 100 in step S705.

In step S802, the lens CPU 426 receives, via the communication contacts 434 and 425, the capturing parameters (zoom position, aperture value, and capturing distance) transmitted from the camera 100 in step S705.

In step S803, the lens CPU 426 acquires, from the lens characteristic value memory 423, wavelength-specific OTF data corresponding to the capturing parameters acquired in step S802. In step S804, the lens CPU 426 reads out the characteristic values of the camera 100, which are acquired from the camera 100 in advance and stored in the internal memory (not shown) of the photographing lens 200.

In step S805, the lens CPU 426 converts the unit of OTF based on the sensor pitch of the image sensor. More specifically, the OTF data stored in the photographing lens 200 in a unit [line pair/mm] independent of the pixel pitch is converted into data in a unit [line pair/pixel] using the sensor pitch of the image sensor. That is, calculation can be done by f[line pair/pixel]=f[line pair/mm]×pixel pitch [mm/pixel]. For example, when the sensor pitch of the image sensor is 7 [μm], calculation can be done by f[line pair/mm]×7×10$^{-3}$ [mm/pixel]. The sensor pitch information is included in the characteristic values of the camera 100 read out in step S804.

In step S806, the lens CPU 426 multiplies the OTF data obtained in step S805 by RGB filter spectral transmittances included in the characteristic values read out in step S804. The OTF data for each frequency is thus converted into OTF data for each of RGB components. In step S807, the lens CPU 426 applies an optical LPF included in the characteristic values read out in step S804 to the OTF data obtained in step S806.

Next, in step S808, the lens CPU 426 creates recovery filters using the OTF data obtained in step S807. To create the recovery filters, a recovery filters in a frequency domain are created using expression (1) described in the related art. Then, Fourier transformation is applied to the recovery filters to obtain recovery filters in the real space.

In step S809, the lens CPU 426 transmits the recovery filters created in step S808 to the camera 100 via the communication contacts 434 and 425. In the continuous shooting mode as in this embodiment, zoom or the stop is often constant. Although the capturing distance may change, the magnitude of a change of the recovery filter with respect to the change of the capturing distance falls within an allowable range.

The influence of the distance on MTF (and OTF) is small. Hence, even when the recovery filter created in accordance with the capturing parameters of the first captured image is used for the second and subsequent captured images, the image recovery result is never much inferior to that when using recovery filters created based on second and subsequent captured images. According to this embodiment, the recovery filter is requested only for the first captured image in the continuous shooting mode where many images are captured in a short time. It is therefore possible to reduce the load necessary for recovery filter creation on the lens side and also decrease the communication capacity between the lens and the camera. This allows a comfortable operation speed to be maintained.

In this embodiment, once the camera transmits its characteristic values to the lens at the start, communication between the lens and the camera is done only by transmitting/receiving data in a relatively small size. This enables smooth communication between the lens and the camera.

Second Embodiment

In the first embodiment, regarding that the capturing parameters of the first image and those of the second image captured by continuous shooting are almost the same, the number of times of recovery filter request can be reduced only in the continuous shooting mode. In this method, however, recovery filter request is done for the lens at least once every time continuous shooting is to be executed.

In the second embodiment, a cache memory for temporarily storing capturing parameters of previous time and recovery filters corresponding to them is provided in the camera. When the release button is pressed fully, the capturing parameters of previous time are compared with those of current time. Only when the difference falls outside an allowable range, the camera requests new recovery filters of the lens.

Figure 6:
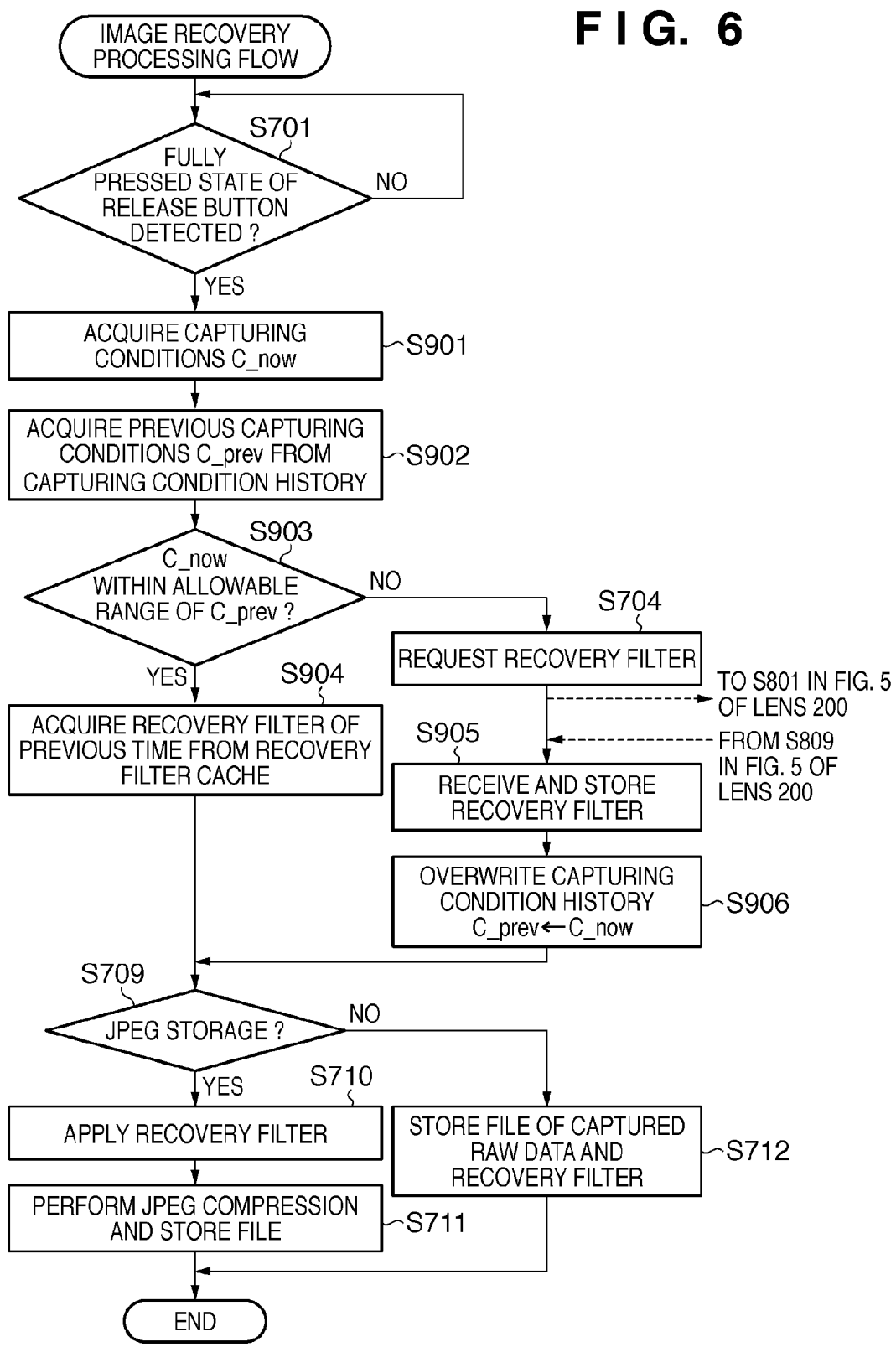
FIG. 6 is a flowchart illustrating the operation of the camera 100.

Processing to be performed by a camera 100 according to this embodiment will be described with reference to the flowchart of FIG. 6. Note that the same step numbers as in FIG. 4 denote the same process steps in FIG. 6, and a description thereof is the same as in the first embodiment and will therefore be omitted.

When a camera CPU 436 determines that a release button 114 is fully pressed, the process advances to step S901. In step S901, the camera CPU 436 acquires capturing parameters (capturing conditions) C_now of current time from the internal memory (not shown) of the camera 100. In step S902, the camera CPU 436 acquires capturing parameters C_prev set previous time from the memory. In step S903, the camera CPU 436 compares the capturing parameters C_now with the capturing parameters C_prev, and determines whether the difference in each of the stop, zoom, and capturing distance falls within an allowable range. Upon determining that the differences fall within the allowable ranges, the camera CPU 436 determines that sufficient recovery can be obtained using the recovery filters corresponding to the capturing parameters C_prev for captured images of current time, and the process advances to step S904. On the other hand, the differences fall outside the allowable ranges, the process advances to step S704.

Figure 7A:
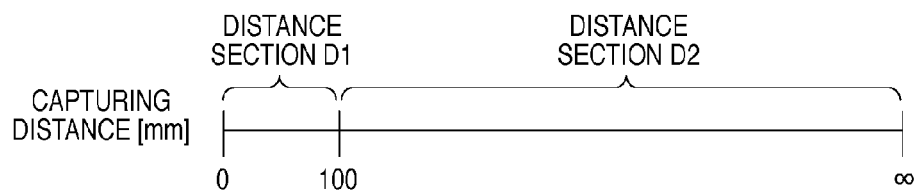
FIGS. 7A to 7C are views showing the allowable range sections of capturing parameters.
Figure 7B:
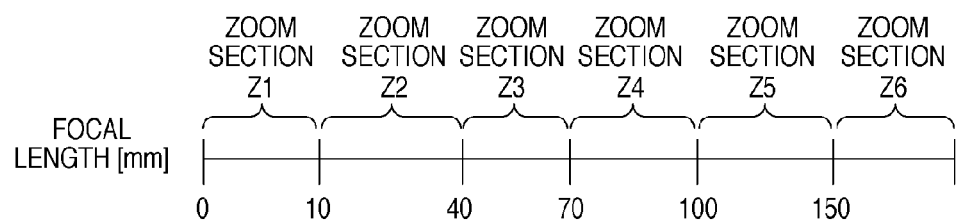
Figure 7C:
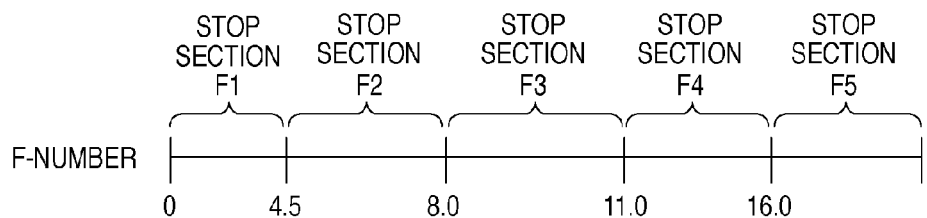

Determining whether the differences fall within the allowable ranges will be described with reference to FIGS. 7A to 7C. Each of the capturing distance, focal length, and aperture value (f-number) is divided into several sections, as shown in FIGS. 7A to 7C. For each of the capturing distance, focal length, and f-number, if the capturing parameter C_now and the capturing parameter C_prev belong to the same section, the difference between the capturing parameter C_now and the capturing parameter C_prey is determined to fall within the allowable range. Otherwise, the difference is determined to fall outside the allowable range.

For example, assume that the capturing parameters C_prev represent capturing distance=2000 [mm], focal length=50 [mm], and f-number=5.0, and the capturing parameters C_now represent capturing distance=1000 [mm], focal length=50 [mm], and f-number=8.0. In this case, for C_prev and C_now, the capturing distances are in a distance section D2, the focal lengths are in a zoom section Z3, and the f-numbers are in a stop section F2. Hence, the difference between C_prev and C_now is determined to fall within the allowable range. On the other hand, if the capturing parameters C_now represent capturing distance=1000 [mm], focal length=50 [mm], and f-number=3.0, the f-numbers are in different stop sections F1 and F2. Hence, the difference is determined to fall outside the allowable range.

Referring back to FIG. 6, in step S904, the camera CPU 436 acquires, from the internal memory (not shown) of the camera 100, recovery filters acquired from a photographing lens 200 previous time and recorded in the memory as a history. The acquired recovery filters correspond to the capturing parameters C_prev.

On the other hand in step S704, the camera CPU 436 requests recovery filters of the photographing lens 200, as described in the first embodiment. Hence, in step S905, the camera CPU 436 receives recovery filters transmitted from the photographing lens 200 in response to the request. The received recovery filters are stored in the memory as a history. In step S906, the capturing parameters C_now are overwritten on the capturing parameters C_prev.

According to this embodiment, a new buffer for storing the history of capturing parameters is necessary. However, the number of times of recovery filter request for the lens can be reduced, and both the communication data amount between the lens and the camera and the load necessary for recovery filter creation in the lens can be decreased. In image capturing under the same conditions, the process speed increases because no recovery filter request is made.

Note that in this embodiment, the allowable range is determined based on the sections shown in FIGS. 7A to 7C. However, the allowable range may be set with margins in the ±directions from a condition in C_prev. For example, the zoom range is determined to ±15 mm of the focal length in C_prev. In this case, if the focal length of C_prev is 50 mm, the allowable range of zoom is 35 to 65 mm. Alternatively, the lens performance is normalized to 0 to 1, and the range may be divided into a plurality of parts to create an allowable range. For example, assume that the focal length of zoom is divided into three parts. If a lens has a zoom range of 24 to 70 mm, the range is divided into three parts 24 to 39 mm, 39 to 55 mm, and 55 to 70 mm.

The allowable range may be changed for each lens by, for example, acquiring it from the lens. In this case, the allowable range information is acquired from the lens before or after "camera characteristic value transmission" in FIG. 3. Alternatively, when transmitting a recovery filter from the lens to the camera, the allowable range condition of the recovery filter may be transmitted together. In this embodiment, three capturing parameters, that is, stop, zoom, and capturing distance are used. If the influence of the capturing distance on the recovery filter is small, the capturing distance may be removed from the capturing parameters. In this embodiment, the recovery filter is stored in the camera. Instead, a storage memory may be provided on the lens side to store the recovery filter. Note that when capturing a moving image in the flowchart of FIG. 6, the process from step S901 to a process immediately before step S709 is performed for each frame.

Third Embodiment

In the second embodiment, only the immediately preceding recovery filters and capturing parameters are held as a history. However, a camera 100 may hold recovery filters and capturing parameters of past few times as a history.

When storing a newly acquired recovery filter as a history, if the recovery filter storage area has no remaining capacity, several data in the recovery filter storage area need to be erased to store the newly acquired recovery filter.

For example, when a stop priority mode is set, the stop is fixed, and zoom is expected to frequently change. For this reason, recovery filters for the same aperture value are desired to leave as much as possible. In a shutter speed priority mode or continuous shooting mode, the stop is expected to change more frequently than zoom. Hence, recovery filters for the same zoom value are desired to leave as much as possible. In this embodiment, a method of updating stored data corresponding to a capturing mode when storing recovery filters corresponding a plurality of capturing conditions will be described.

Figure 8:
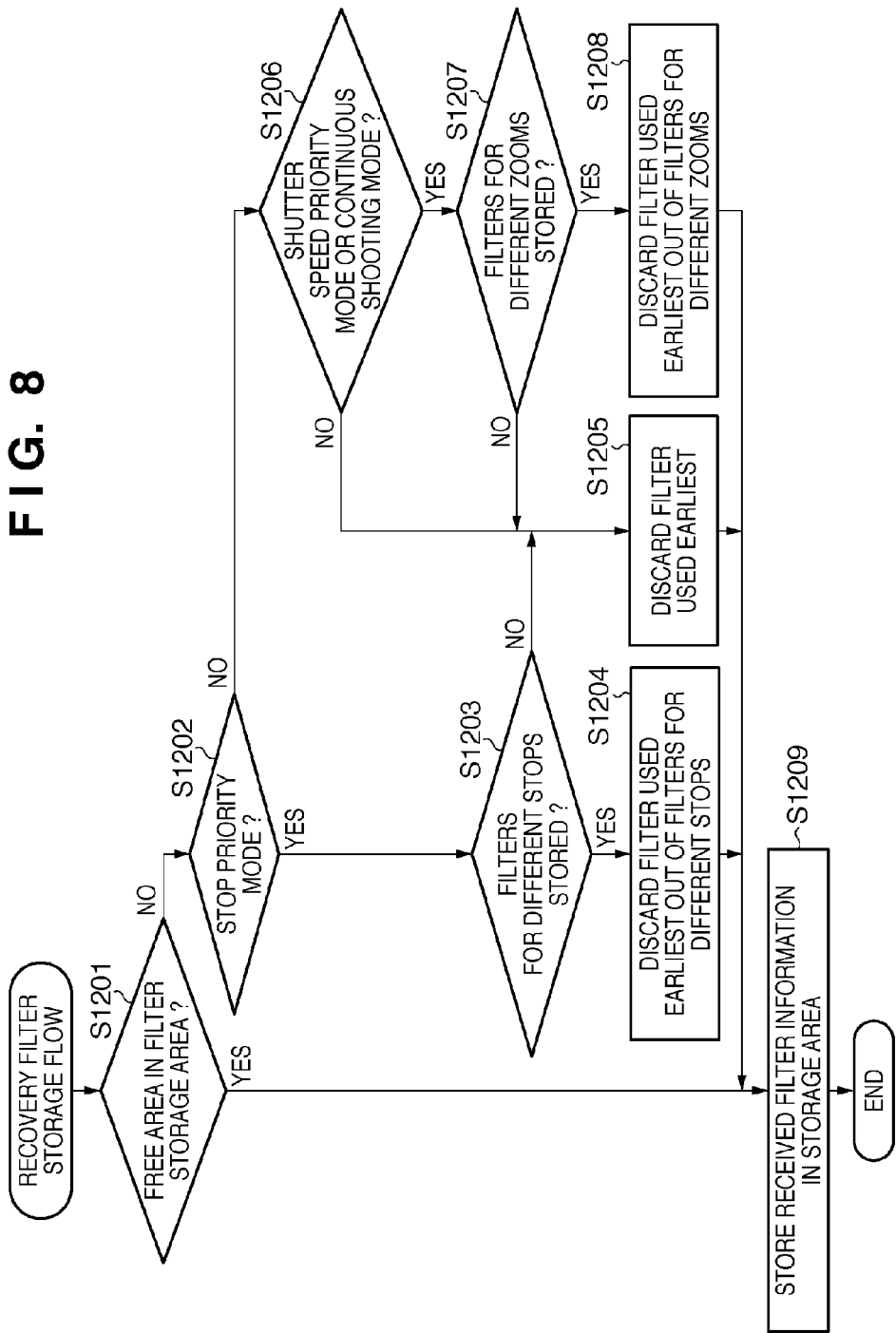
FIG. 8 is a flowchart of processing of storing a recovery filter and capturing parameters.

This embodiment is different from the second embodiment only in processing of storing recovery filters and capturing parameters. The processing of storing recovery filters and capturing parameters in steps S905 and S906 will be described below with reference to the flowchart of FIG. 8. In this embodiment, stored recovery filters have a list structure in which the data can be sorted in the order of use.

Figure 9:
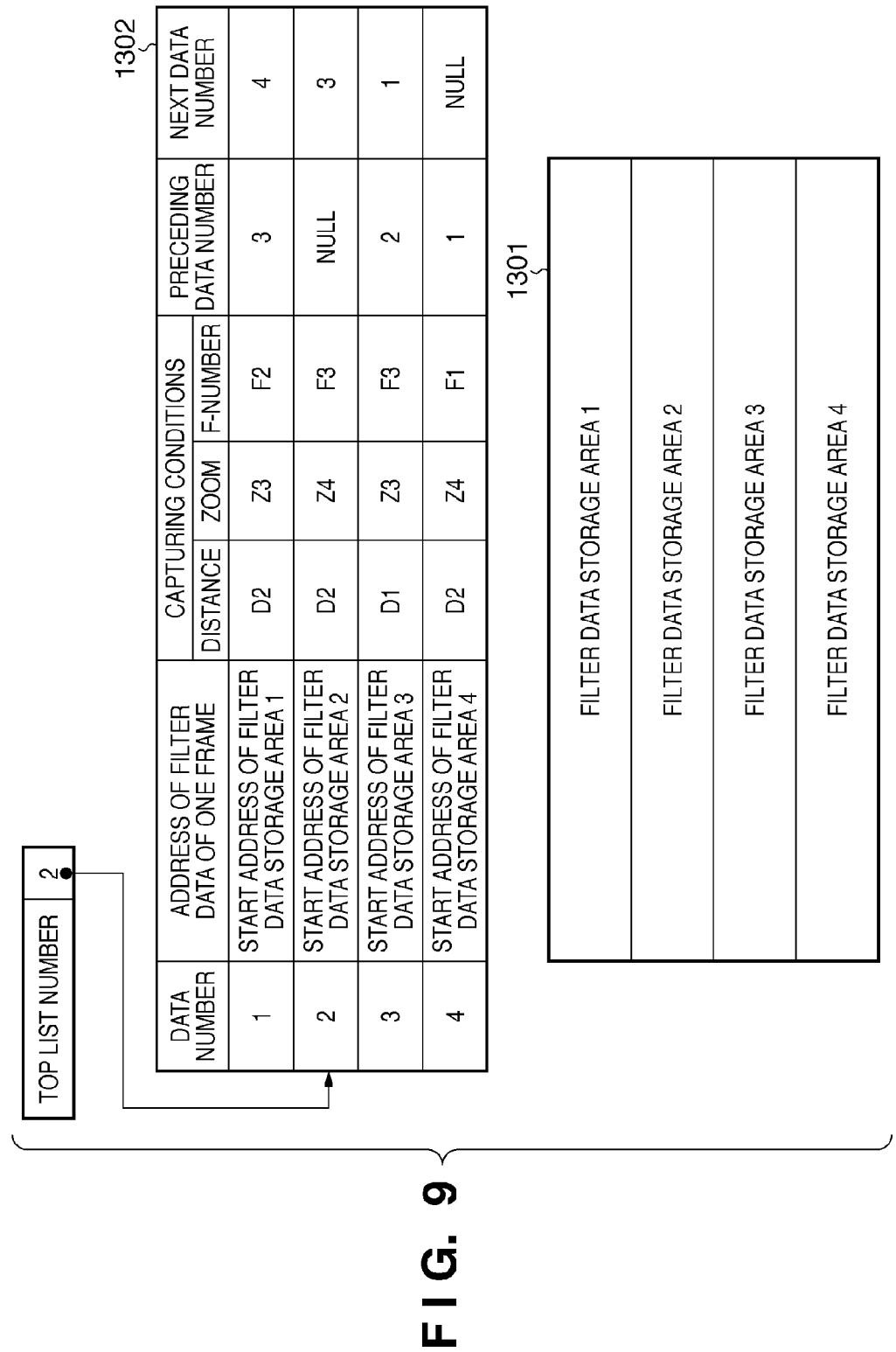
FIG. 9 is a view showing a system for managing recovery filters and capturing parameters.

A system for managing recovery filters and capturing parameters will be described with reference to FIG. 9. An area 1301 having filter data storage areas 1 to 4 each for storing recovery filters of one frame is set in the internal memory of the camera 100. Recovery filters and corresponding capturing parameters to be stored in each of the filter data storage areas 1 to 4 are managed in a management table 1302 which is also stored in the internal memory of the camera 100.

The numbers (data numbers) of the filter data storage areas, the start addresses of the filter data storage areas, and capturing parameters corresponding to the recovery filters stored in the filter data storage areas are registered in the management table 1302. Data serving as bidirectional pointers (the number of preceding data and the number of next data) capable of connecting the data in the order of recovery filter use are also registered in the management table 1302. The capturing parameters include a zoom position, aperture value, and capturing distance, as in the first embodiment, and their allowable sections are written in the management table 1302. In FIG. 9, the storable number of capturing parameters of recovery filters is four. The storable number of capturing parameters of recovery filters can easily be calculated from the data size of the recovery filter and the management table 1302 that actually stores the recovery filter. As is apparent from FIG. 9, the order of recovery filter use is 2→3→1→4 in data number.

In step S1201, a camera CPU 436 determines whether the area 1301 has a free area to store and hold new recovery filter data. Upon determining that a free area exists, the process advances to step S1209. Upon determining that no free area exists, the process advances to step S1202. In FIG. 9, all the filter data storage areas 1 to 4 store recovery filter data, and no free area exists. In this case, the process advances to step S1202.

In step S1202, the camera CPU 436 determines whether the capturing mode set before image capturing is the stop priority mode. Upon determining that the stop priority mode is set, the process advances to step S1203. If the mode is not the stop priority mode, the process advances to step S1206.

In step S1203, the camera CPU 436 compares capturing parameters C_now with capturing parameters C_prev registered in the management table 1302, and checks whether the aperture values belong to different allowable range sections. In this way, the camera CPU 436 can determine whether an aperture value in an allowable range different from that of the aperture value included in the capturing parameters C_now is registered in the management table 1302.

If it is determined as the result of comparison that an aperture value in an allowable range different from that of the aperture value included in the capturing parameters C_now is registered in the management table 1302, the process advances to step S1204. On the other hand, if an aperture value in an allowable range different from that of the aperture value included in the capturing parameters C_now is not registered in the management table 1302, the process advances to step S1205.

In step S1204, the camera CPU 436 specifies, from the management table 1302, the data numbers of capturing parameters including aperture values in allowable ranges different from that of the aperture value included in the capturing parameters C_now. For example, if the recovery filters received this time are based on capturing conditions, stop priority mode/stop allowable range section F3, f-numbers included in the capturing parameters corresponding to data numbers 1 and 4 in the management table 1302 fall outside the stop allowable range section F3. Hence, in this case, data numbers 1 and 4 are specified. Next, out of data numbers 1 and 4, the data number of the recovery filters used earliest is specified. In this case, since data number 1 is specified, the capturing parameters, preceding data number, and succeeding data number corresponding to data number 1 are deleted from the management table 1302. In addition, the recovery filters in the filter data storage area 1 represented by the address corresponding to data number 1 are deleted. When the preceding data number and succeeding data number corresponding to data number 1 are deleted from the management table 1302, the preceding data numbers and succeeding data numbers corresponding to data numbers 3 and 4 need to be updated accordingly, as a matter of course. More specifically, the preceding data number and succeeding data number corresponding to data number 3 are updated to 2 and 4, and the preceding data number and succeeding data number corresponding to data number 4 are updated to 3 and NULL.

On the other hand, in step S1206, the camera CPU 436 determines whether the capturing mode set before image capturing is the shutter speed priority mode or continuous shooting mode. Upon determining that the shutter speed priority mode or continuous shooting mode is set, the process advances to step S1207. If the mode is neither the shutter speed priority mode nor the continuous shooting mode, the process advances to step S1205.

In step S1207, the camera CPU 436 compares the capturing parameters C_now with the capturing parameters C_prev registered in the management table 1302, and checks whether the zoom values belong to different allowable range sections. In this way, the camera CPU 436 can determine whether a zoom value in an allowable range different from that of the zoom value included in the capturing parameters C_now is registered in the management table 1302.

If it is determined as the result of comparison that a zoom value in an allowable range different from that of the zoom value included in the capturing parameters C_now is registered in the management table 1302, the process advances to step S1208. On the other hand, if a zoom value in an allowable range different from that of the zoom value included in the capturing parameters C_now is not registered in the management table 1302, the process advances to step S1205.

In step S1208, the camera CPU 436 specifies, from the management table 1302, the data numbers of capturing parameters including zoom values in allowable ranges different from that of the zoom value included in the capturing parameters C_now. Then, out of the recovery filters of the specified data numbers, the recovery filter used earliest and the capturing parameters, preceding data number, and succeeding data number corresponding to the data number of the recovery filter are deleted. The deletion processing and related processing of updating the management table 1302 are the same as in step S1204 described above, and a detailed description thereof will not be repeated.

In step S1209, the data of the recovery filters received this time is stored in the free filter data storage area (or a filter data storage area made free by the above-described deletion processing) of the area 1301. The capturing parameters of the recovery filters received this time are registered as capturing parameters corresponding to the data number at which the address of the filter data storage area used for the storage is registered. The preceding data number and succeeding data number corresponding to each data number are updated.

In this embodiment, only still image capturing has been explained. Some of recent lens-interchangeable cameras can capture both a still image and a moving image. In moving image capturing, the stop frequently changes in general to maintain predetermined brightness, as in continuous shooting. The zoom is therefore often fixed as compared to the stop. Hence, recovery filters corresponding to different zoom values are desired to delete in chronological order. For a camera capable of capturing both a still image and a moving image, a process of determining whether the mode is the moving image capturing mode is added to step S1206.

Other Embodiments

In the first embodiment, the operation in the continuous shooting mode has been described. The operation can also be performed in live view capturing. Live view capturing is a function of projecting an image on the sensor to the LCD monitor device 417 for the user. In this case, since the image size to be used is different, the sensor pitch in the live view display mode needs to be used. The recovery filter size is different from that of a recovery filter used for a captured image. To do this, a filter application purpose is added to the capturing conditions in the second embodiment, and determining whether the filter application purpose in C_now is the same as that in C_prev is added to the allowable range determination.

The user can switch the output resolution (the number of recording pixels) on the camera at the time of image capturing. For, for example, a JPEG image, the user can select one of large size (5616×3744 pixels), middle 1 size (4992×3328 pixels), middle 2 size (4080×2720 pixels), and small size (2784×1856 pixels). For RAW data, the user can select one of two sizes (5616×3744 pixels and 2784×1856 pixels).

Two methods are used to change the output resolution: a method of thinning out pixels from the maximum output size after development processing and a method of thinning out pixels from the maximum output size before development processing. In the latter method of thinning out pixels before development processing, since the size of an image to be recovered is different, the filter size changes, as in live view capturing. In this case, an output resolution is added to the capturing conditions in the second embodiment, and determining whether the output resolution in C_now is the same as that in C_prev is added to the allowable range determination.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-153990 filed Jun. 29, 2009 which is hereby incorporated by reference herein in its entirety.

What is claimed is:

1. A lens-interchangeable camera mounted with a lens, comprising:
    a transmission unit that transmits, to the lens, image processing parameters including a sensor pitch of an image sensor, an optical low-pass filter, and spectral transmittances of color component filters of the lens-interchangeable camera;
    a determination unit that determines, after a start of image capturing, whether or not send, to the lens, a transmission request of recovery filters to be used to recover degradation of a captured image;
    a request unit that sends the transmission request by transmitting capturing parameters set for image capturing to the lens when said determination unit determines to send the transmission request;
    a reception unit that receives the recovery filters corresponding to the capturing parameters, the recovery filter being created by the lens based on the image processing parameters and transmitted from the lens in response to the transmission request; and
    a unit that stores, in a memory, the recovery filters received by said reception unit.

2. The camera according to claim 1, wherein said transmission unit transmits the image processing parameters to the lens before image capturing.

3. The camera according to claim 1, wherein said determination unit determines to send the transmission request upon capturing a first image in continuous shooting.

4. The camera according to claim 1, wherein said determination unit determines to send the transmission request when a difference between a capturing parameter set at the start of image capturing and a previously set capturing parameter falls outside an allowable range.

5. The camera according to claim 1, further comprising a unit that performs processing of recovering the degradation of the captured image using the recovery filters stored in the memory.

6. The camera according to claim 1, wherein the capturing parameters include an aperture value, a zoom position, and a capturing distance.

7. A method of controlling a lens-interchangeable camera mounted with a lens, comprising the steps of:
    transmitting, to the lens, image processing parameters including a sensor pitch of an image sensor, an optical low-pass filter, and spectral transmittances of color component filters of the lens-interchangeable camera;
    determining, after a start of image capturing, whether or not send, to the lens, a transmission request of recovery filters to be used to recover degradation of a captured image;
    sending the transmission request by transmitting capturing parameters set for image capturing to the lens when it is determined in the determining step to send the transmission request;
    receiving the recovery filters corresponding to the capturing parameters, the recovery filter being created by the lens based on the image processing parameters and transmitted from the lens in response to the transmission request; and
    storing, in a memory, the recovery filters received in the receiving step.

* * * * *